United States Patent [19]

Jaisinghani et al.

[11] Patent Number: 4,579,637
[45] Date of Patent: Apr. 1, 1986

[54] METHOD AND APPARATUS FOR SEPARATING IMPURITIES FROM LOW CONDUCTIVITY LIQUIDS

[75] Inventors: Rajan A. Jaisinghani, Midlothian, Va.; Robert A. Fjeld, Clemson, S.C.

[73] Assignee: American Filtrona Corporation, Richmond, Va.

[21] Appl. No.: 569,596

[22] Filed: Jan. 10, 1984

[51] Int. Cl.⁴ .............................................. B03C 5/00
[52] U.S. Cl. .................... 204/186; 204/181.8; 204/181.9; 204/299 R; 204/302; 204/188; 204/190
[58] Field of Search ............... 204/184, 185, 188, 189, 204/190, 191, 186, 180 R, 299 R, 302, 181.8, 181.9

[56] References Cited

U.S. PATENT DOCUMENTS

| | | | |
|---|---|---|---|
| 2,381,455 | 8/1945 | Jacob | 55/102 |
| 3,129,157 | 4/1964 | Loeckenhoff | 204/180 R |
| 3,205,160 | 9/1965 | Stenzel et al. | 204/180 R |
| 3,412,002 | 11/1968 | Hubby | 204/184 |
| 3,489,669 | 1/1970 | Ruhnke | 204/184 |
| 3,766,034 | 10/1973 | Veltman | 204/149 |
| 3,789,214 | 1/1974 | Goldie et al. | 250/432 R |
| 3,909,383 | 9/1975 | Sato | 204/186 |
| 4,144,456 | 3/1979 | Bosshard | 250/437 |

OTHER PUBLICATIONS

The Condensed Chemical Dictionary, 8th Ed., Van Nostrand Reinhold Co., 1971, p. 751.

Primary Examiner—Andrew H. Metz
Assistant Examiner—B. J. Boggs, Jr.
Attorney, Agent, or Firm—Holman & Stern

[57] ABSTRACT

A method and apparatus for removing particulate matter suspended in low conductivity liquids employs extrinsic ions to electrically charge suspended particles. A unipolar current of the extrinsic ions is passed through the flowing liquid to efficiently charge the particles. The charged particles may then be removed by agglomeration and sedimentation techniques, or by other means. A stripping section is disposed upstream of the region in which the particles are charged, in order to strip the double layer of counter ions from the particles before the particles are charged.

17 Claims, 3 Drawing Figures

METHOD AND APPARATUS FOR SEPARATING IMPURITIES FROM LOW CONDUCTIVITY LIQUIDS

BACKGROUND OF THE INVENTION

1. Technical Field

The present invention relates to separation of impurities from liquids and, more particularly, to the use of electric fields to effect separation of impurity particles from low dielectric liquids having ultra-low electrical conductivity. An example of such a liquid is oil.

2. Discussion of the Prior Art

Conventional solid-liquid separation methods, such as barrier or deep bed filtration, gravitational settling, centrifugation and rotary drum precoat filtration, are generally ineffective or prohibitively expensive for use in separating small particles from from viscous fluids such as low conductivity liquids. This is especially true for applications involving very small particles or highly viscous liquids because conventional methods depend upon gravitational force, particle inertia, or fluid forces; in some cases, conventional techniques require that the liquid be forced through porous filtration media.

Separation techniques based on electrical forces have particular applicability to problems involving small particles and high viscosity liquids. This is true because the electrical force acts primarily on the particles, and also because the electrical force can be significantly larger than gravitational and fluid forces. Two electrical transport mechanisms, namely dielectrophoresis and electrophoresis, have been suggested in the prior art as a basis for particle separation technology.

Dielectrophoresis is the transport of an uncharged, polarizable particle in a nonuniform electric field. Dielectrophoresis forms the basis of the particle separator disclosed in U.S. Pat. No. 3,928,158 to Fritsche. The separator device in Fritsche was developed to remove catalyst fines from decanted oil to produce a low ash carbon black feedstock. The device includes concentric cylindrical electrodes with ceramic or glass beads filling the inter-electrode space. A large potential difference is applied to the electrodes so that the high gradient in the electric field existing near the points of contact of the glass beads effects particle removal.

Electrophoresis is the transport of a charged particle in an electric field. Particles suspended in aqueous systems often carry a net charge, and electrophoresis takes advantage of this fact and is widely utilized in bio-medical applications and has also been suggested for aqueous systems. However, the aqueous applications of electrical filtration are severely limited by high power consumption even at low electric fields. In dielectric liquids, on the other hand, it is possible to use much higher fields (for example, on the order of $10^6$ to $10^7$ volts per meter). Although particles present in some hydrocarbon liquids have been found to carry a net charge, the particle charge levels are often too low for effective filtration. For this reason, the cross-flow electrofiltration concept has been modified in some prior art systems to render it applicable to low conductivity liquids by adding a surfactant to the liquid for the purpose of enhancing particle charge.

Prior to the present invention, all electrokinetic methods for separating particles from liquids depend upon chemical additives for particle charge acquisition. The principal mechanism is the preferential adsorption of either positive or negative ions in solution. In low conductivity liquids the concentration of these ions (referred to herein as intrinsic ions) is often too low for the particle charge acquisition to be significant. For this reason, as noted above, surfactants have been added to the liquids. This increases liquid conductivity and can increase charge levels. These enhanced charge levels are still too low for economical particle separation via electrical methods, due to the typical high viscosity of oils. Also, due to increase of liquid conductivity, the electrical power consumption also increases with the addition of ionic chemicals.

For definitional purposes, intrinsic ions are those attributable to the inherent conductivity of the liquid, dissociated electrolytes or other chemical processes. Ions produced by electrical discharge or by ionizing radiation, or those emitted from an electrode, are referred to as extrinsix ions. The present invention relates to the use of extrinsic ions.

OBJECTS AND SUMMARY OF THE INVENTION

It is an object of the present invention to provide an improved method and apparatus for effecting separation of particles from low conductivity liquids.

It is another object of the present invention to employ electrical fields to separate impurity particles from low dielectric, ultra-low conductivity liquids, such as oils.

Still another object of the present invention is to provide a method and apparatus for separating particles from liquids wherein the particles are charged by means of extrinsic ions.

It is a further object of the present invention to provide a method and apparatus for separating impurity particles from a liquid wherein the particles are charged by exposing them to a unipolar current of extrinsic ions flowing substantially transversely to a flowing liquid containing the impurity particles.

In accordance with the present invention, ions are generated in close proximity to one of two electrodes disposed to establish an electric field across a flow path through which the impurity-laden liquid is caused to flow. The ions may be generated by means of ionizing radiation, electrical breakdown in the liquid or direct emission of ions or electrons proximate the one electrode. The electric field established by the electrodes separates the generated ions by causing ions of one polarity to collect at the adjacent electrode and driving the other ions across the bulk of the flowing liquid. Particles suspended in the liquid become charged by the latter ions at levels which are much higher than charges obtained by chemical processes because the particles are exposed to ions of only one polarity. A stripping region is provided in the flow path and takes the form of an electric field which strips the double layer of counter ions from impurity particles before the particles enter the charging section in which the cross flow of unipolar extrinsic ions takes place. The stripping operation enables more efficient utilization of the extrinsic ion charging section.

The charged impurity particles may be removed from the liquid by agglomeration and/or sedimentation techniques or by the application of electrokinetic techniques, such as passing the liquid through porous media which are charged oppositely to the charge of the impurity particles.

In one disclosed embodiment, the initial liquid may be divided into two separate flow paths wherein the liquid is exposed to charge sections of different polarity. The resulting opposite charges on the impurity particles is utilized to advantage in an agglomerator to which the separate liquid flows are conducted and in which the oppositely polarized particles agglomerate so as to permit removal by conventional sedimentation equipment.

BRIEF DESCRIPTION OF THE DRAWINGS

These and other objects and advantages of the present invention will become more apparent from the following detailed description and appended claims, taken in conjuction with the accompanying drawings in which;

DESCRIPTION OF THE PREFERRED EMBODIMENTS

Figure 1:
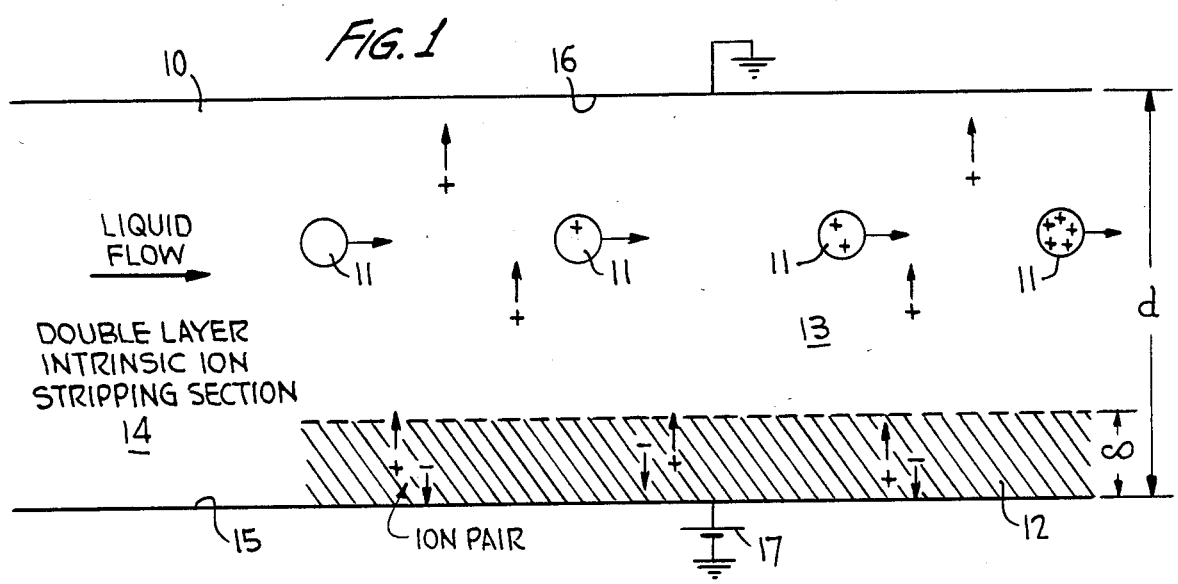
FIG. 1 is a diagrammatic illustration of the manner in which particles are stripped and charged in accordance with the present invention.

Specific reference is now made to FIG. 1 of the accompanying drawings wherein a flow path 10 is diagrammatically represented. Liquid, with impurity particles 11 therein, is caused to flow through path 10. The path includes a charging region 13 disposed between two electrodes 15 and 16. An electrical field E is established between electrodes 15 and 16 by means of a voltage source schematically represented at 17. In the illustrated embodiment, electrode 15 is charged positive relative to electrode 16.

An ionization region is generally designated by the reference numeral 12 and is disposed adjacent electrode 15. The ionization region extends only a short distance into the flow path from electrode 15, which distance is exaggerated in FIG. 1 in order to facilitate understanding of the principles of the present invention. A stripping section 14 is disposed between electrodes 15 and 16 at a flow location which is upstream of the charging region 13 and the ionization region 12.

Extrinsic ions are generated in the ionization region 12 in close proximity to electrode 15. The extrinsic ions are represented by "+" and "−" symbols representing their polarity in the drawing. The extrinsic ions may be generated by electrical breakdown or ionizing radiation in the liquid proximate electrode 15. An alternative for producing extrinsic ions in region 12 is direct emission of ions or electrons from an electrode. If ionization radiation is employed, a preferred approach is the use of a low level radiation source (for example krypton 85) to irradiate the liquid in ionization region 12 proximate electrode 15. The intrinsic conductivity of petroleum and other low conductivity oils is usually much higher than air and other gases. In order to produce a unipolar current of extrinsic ions for charging the particles 11, the region in which the ionization occurs must be very close to electrode 15 (or to electrode 16, depending upon the polarity with which particles 11 are to be charged). Thus, when radiation is used to effect ionization, the penetration of the radiation into the liquid must be very small. Suitable types of radiation are alphas, betas and low energy gammas. This is to be contrasted with gases in which penetration of radiation is on the order of 1,000 times greater than is the case for liquids. Only alphas and very low energy betas can be used to generate unipolar ion currents in gases.

No matter how the extrinsic ions are generated, the electric field E in the inter-electrode space serves to separate the "+" and "−" ions. For the polarity shown, the "−" ions are attracted to and collect at the positive electrode 15. The "+" extrinsic ions are driven by the electric field E across the liquid flow through path 10 to effect a unipolar crosscurrent of extrinsic "+" ions. Particles 11 suspended in the liquid become charged by these "+" extrinsic ions to a positive charge level. As illustrated in the drawing, particles 11 become more positively charged by the extrinsic ions as the particles proceed in a downstream direction through flow path 10. The charge levels achieved in the suspended particles 11 by the unipolar current of extrinsic ions is much higher than the charge levels obtained by chemical processes because the particles 11 are exposed to ions of a single polarity only. In chemical charging, counter ions serve to limit the amount of charge accumulated by a particle. Thus, the exposure of the particles 11 to only unipolar extrinsic ions is a key feature of the invention. The polarity of the extrinsic ions may be either positive or negative, depending upon the potentials of the two electrodes.

In liquids having a non-zero intrinsic conductivity, extrinsic ions may recombine with counter ions that are present in the double layer which forms as a particle acquires charge. This can inhibit the charging process in charging region 13. In order to avoid this inhibition of charging, the stripping section 14 is provided between electrodes 15 and 16 upstream of the ionization region 12 and charging region 13. The electric field in the stripping region serves to strip the double layer of counter ions from the particles 11 prior to entry of the particles into the charging section 13. The stripping section thereby enables a more efficient utilization of the extrinsic ion charging technique. The length of stripping section 14 depends upon the conductivity of the liquid in which particles 11 are suspended; for higher conductivity liquids, the stripping section must be longer.

The charging section 13 and stripping section 14 may take any conventional form. For example, the charging electrode may be concentrically disposed within a cylindrical outer electrode. Alternatively, the electrodes may be spaced across a flow path of generally rectangular configuration. Other electrode configurations may be employed within the context of the present invention.

Figure 2:
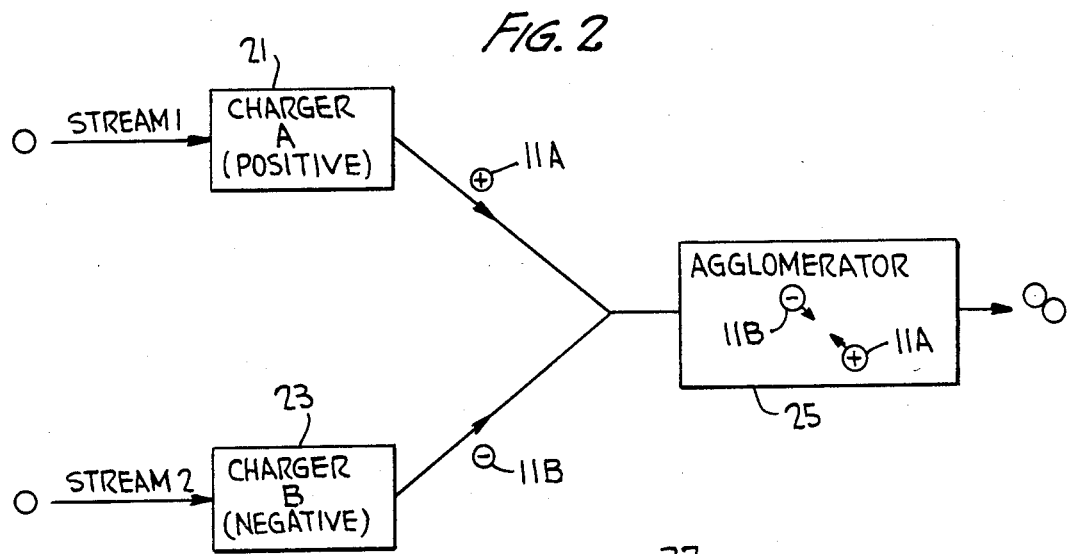
FIG. 2 is a functional block diagram of one embodiment of the present invention.

Separation or removal of the charged particles 11 from the liquid may be effected in any one of numerous ways. For example, referring to FIG. 2 of the accompanying drawings, an agglomeration and sedimentation technique may be employed wherein some of the impurity particles are charged positively and others are charged negatively. Specifically, a positive charger 21, similar to the charger illustrated diagrammatically in FIG. 1, receives the flowing liquid and charges the particles 11 positively to produce charged particles 11A. A separate parallel flow path for part of the same liquid is passed through a charger 23 (charger B) which charges the impurity particles 11 passing therethrough with a negative polarity as represented by the reference numeral 11B. The liquid outflow from the two chargers 21 and 23 are joined together in an agglomerator unit 25. The positively charged particles 11A and the negatively charged particles 11B tend to agglomerate into larger particles in agglomerator 25. These larger particles can be removed from the liquid by conventional sedimentation equipment.

Figure 3:
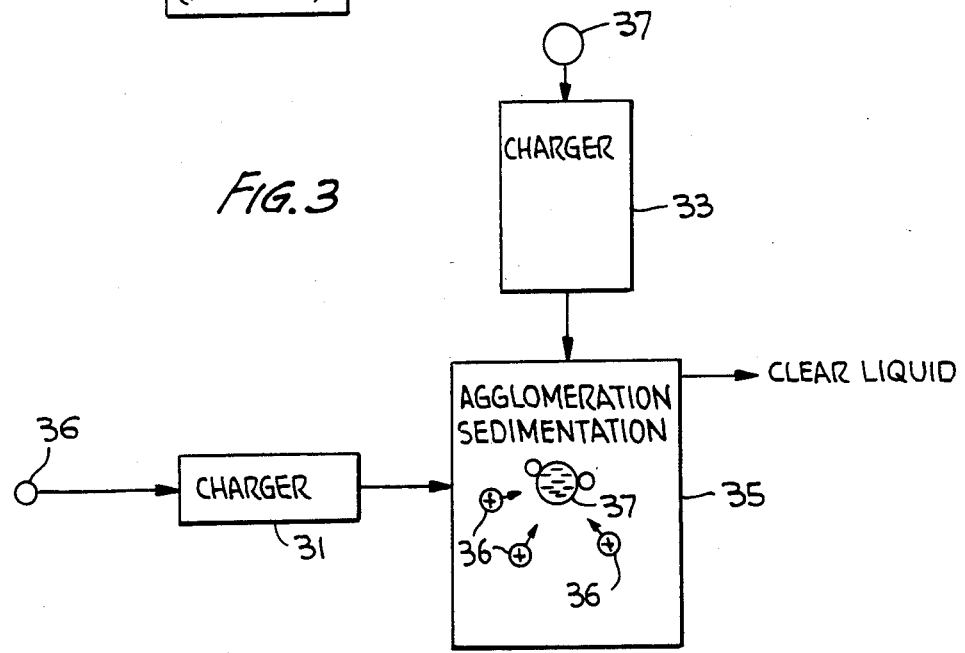
FIG. 3 is a functional block diagram of a second embodiment of the present invention.

An alternative technique is illustrated in FIG. 3 wherein relatively small particles 36 are passed through one charger 31, and relatively large particles 37 are passed through another charger 33 of opposite polarity. In the illustrated embodiment, the larger particles 37 are charged negatively whereas the smaller particles 36 are charged positively. These particles are brought together in agglomeration/sedimentation unit 35 wherein the smaller particles 36 are captured on the surface of the larger particles 37.

Still another approach to enhance separation of particles charged by extrinsic ions is the use of electrical methods. This includes the use of external electric fields applied across media which are porous to the liquid in which the particles are suspended. Examples of such media are fibers, sand, etc. Alternatively, the media itself may be charged. As a further alternative, one may use electric fields for electrophoretic separation (for example, collection on plates or crossflow electrofiltration) of particles which have been charged by extrinsic ions.

Among the numerous applications for the present invention, whereby small particles are efficiently separated from low conductivity liquids, are: removal of ash and catalyst fines which can clog catalyst beds or contaminate petroleum refinery products; ash removal from liquid hydrocarbons, such as solvent-refined coal, heavy refined fuel oils, aviation fuel, and oil from tar sands or shell; removal of water droplets from oils; removal of catalyst fines, corrosive products or other solids from chemical process streams; removal of fines from rolling oils in the metals industry; clarification of vegetable oils; regeneration of commercial cooking oils; and regeneration of hydraulic, transformer and machine oils.

Apart from the separation of particles from low conductivity liquids, the invention described herein, can be utilized for the enhanced suspension of particles in low conductivity liquids. For this purpose, the apparatus comprises of the stripping and charging sections (as shown in FIG. 1) downstream of mechanical or other particle dispersion equipment such as mixers or grinders. The mechanically or otherwise dispersed particles are stripped of the double layer and charged by the extrinsic ions. Since like charged particles repel each other, these particles will tend not to agglomerate and hence maintain their original suspended or dispersed state. The particles to be suspended may be solids or immiscible liquids in low conductivity liquid. In some instances, it may be useful to first charge the particles prior to the mechanical dispersing equipment. Examples of such applications are the suspension of pigments in oil based paints and suspension of oil based pharmaceutical and cosmetic preparations.

Our invention as described hereinabove is a method and apparatus for removing impurity particles from a low conductivity liquid by exposing the particles to a unipolar current of extrinsic ions. While the invention has been particularly shown and described with reference to preferred embodiments thereof, it will be understood by those skilled in the art that various changes in form and detail may be made without departing from the spirit and scope of the invention.

What is claimed is:

1. A method for separating impurity particles from a low dielectric, low conductivity liquid, said method comprising the steps of:
   flowing at least a first portion of said liquid through a prescribed path;
   establishing an electric field across said prescribed path to create a first unipolar current of ions of a predetermined polarity across said prescribed path;
   charging said impurity particles in the prescribed path to said predetermined polarity by exposing the particles to said first unipolar current of ions;
   removing the charged impurity particles from said liquid; and
   stripping double layers of counter ions from said impurity particles prior to exposing said impurity particles to said unipolar current of extrinsic ions.

2. A method for separating impurity particles from a low dielectric, low conductivity liquid, said method comprising the steps of:
   flowing said liquid through a prescribed path;
   establishing, between first and second electrodes, an electric field through the flowing liquid, said electric field being directed generally transversely of the direction of liquid flow in said prescribed path;
   generating extrinsic ions of positive and negative polarity in said flowing liquid in close proximity to said first electrode such that extrinsic ions of one polarity collect at said first electrode and extrinsic ions of opposite polarity are driven by said electric field across the flowing liquid toward said second electrode to charge the impurity particles suspended in the flowing liquid to said opposite polarity;
   removing the charged impurity particles from said liquid; and
   stripping double layers of counter ions from said impurity particles prior to charging said impurity particles with said extrinsic ions of one polarity.

3. A method for separating impurity particles from a low dielectric, low conductivity liquid, said method comprising the steps of:
   flowing at least a first portion of said liquid through a prescribed path;
   creating ions of two polarities in said first portion of said liquid;
   establishing an electric field, between first and second electrodes disposed externally of said prescribed path, substantially transversely across said liquid in said prescribed path to create a first unipolar current of ions of a predetermined polarity directed across said prescribed path;
   charging said impurity particles in the prescribed path to said predetermined polarity by exposing the particles to said first unipolar current of ions;
   removing the charged impurity particles from said liquid; and
   generating, in said liquid, extrinsic ions of said predetermined polarity and of a polarity opposite said predetermined polarity in close proximity to said first electrode such that said extrinsic ions of said opposite polarity collect at said first electrode and said extrinsic ions of said predetermined polarity are attracted toward said second electrode and thereby make up said unipolar current.

4. The method according to claim 3 wherein the ions in said first unipolar current are extinsic ions.

5. The method according to claim 3 wherein the step of removing includes attracting the charged impurity particles to matter charged with a polarity opposite said predetermined polarity.

6. The method according to claim 3 wherein the step of removing the charged impurity particles includes the step of passing the liquid through matter which is porous to the liquid and charged with a polarity opposite the polarity of the charged impurity particles so as to attract and collect the charged particles on said matter.

7. The method according to claim 3 wherein the step of removing includes passing the liquid through a further electric field.

8. The method according to claim 3 further comprising the step of stripping double layers of counter ions from said impurity particles prior to exposing said impurity particles to said unipolar current of extrinsic ions.

9. The method according to claim 3 wherein the step of generating extrinsic ions comprises the step of exposing liquid closely proximate said first electrode to ionizing radiation.

10. The method according to claim 3 wherein the step of generating extrinsic ions comprises the step of electrically breaking down the liquid located closely proximate said first electrode.

11. A method for separating impurity particles from a low dielectric, low conductivity liquid, said method comprising the steps of:
    flowing at least a first portion of said liquid through a prescribed path;
    establishing an electric field across said prescribed path to create a first unipolar current of ions of a predetermined polarity across said prescribed path;
    charging said impurity particles in the prescribed path to said predetermined polarity by exposing the particles to said first unipolar current of ions;
    removing the charged impurity particles from said liquid;
    flowing a second portion of said liquid, separate from said first portion, through a second path;
    establishing an electrical field across said second path to create a second unipolar current of ions across said second path, said ions in said second unipolar current having a second polarity opposite said predetermined polarity;
    charging said impurity particles in said second path to said second polarity by exposing the particles flowing in said second path to said second unipolar current of ions; and
    mixing the flowing liquid from the prescribed and second paths;
    wherein the step of removing includes agglomerating the charged particles having said predetermined polarity with the particles having said second polarity in the mixed liquid, and separating the agglomerating particles from the mixed liquid.

12. The method according to claim 11 wherein the step of separating includes sedimentation of the agglomerated particles.

13. The method according to claim 11 wherein particles charged with said second polarity are larger than particles charged with said predetermined polarity, whereby particles charged with said predetermined polarity collect on the surface of particles charged with said second polarity.

14. A method according to claim 11 wherein the ions in said first and second unipolar currents are extrinsic ions.

15. Apparatus for separating impurity particles from a low dielectric, low conductivity liquid, said apparatus comprising:
    means defining a prescribed flow path for conducting flow of said liquid;
    means establishing an electric field across said prescribed flow path for creating a first unipolar current of ions of a first polarity transversely across said prescribed flow path;
    charging means for charging said impurity particles with said first polarity in said prescribed flow path, said charging means including further means for passing said unipolar current of ions substantially transversely through said prescribed flow of fluid;
    means for removing the charged impurity particles from said liquid; and
    stripping means for stripping double layers of counter ions from said impurity particles before the impurity particles are charged by said charging means.

16. Apparatus for separating impurity particles from a low dielectric, low conductivity liquid, said apparatus comprising:
    means defining a prescribed flow path for conducting flow of said liquid;
    means establishing an electric field across said prescribed flow path for creating a first unipolar current of ions of a first polarity transversely across said prescribed flow path;
    charging means for charging said impurity particles with said first polarity in said prescribed flow path, said charging means including further means for passing said unipolar current of ions substantially transversely through said prescribed flow of fluid;
    means for removing the charged impurity particles from said liquid;
    first and second electrode means of first and second polarity, respectively, for establishing an electric field substantially transversely of liquid flow direction in said prescribed flow path; and
    means for generating, in said liquid, extrinsic ions of said first polarity in close proximity to said first electrode means of said first polarity.

17. Apparatus for separating impurity particles from a low dielectric, low conductivity liquid, said apparatus comprising:
    means defining a prescribed flow path for conducting flow of said liquid;
    means for creating ions of two polarities in fluid flowing in said prescribed flow path;
    first and second electrode means establishing an electric field substantially transversely across said fluid in said prescribed flow path for creating a first unipolar current of ions of a first polarity directed transversely across said prescribed flow path;
    charging means for charging said impurity particles with said first polarity in said prescribed flow path, said charging means including further means for passing said unipolar current of ions substantially transversely through said prescribed flow of fluid; and
    means for removing the charged impurity particles from said liquid.

* * * * *